(12) United States Patent
Willats et al.

(10) Patent No.: US 10,337,380 B2
(45) Date of Patent: Jul. 2, 2019

(54) MIXER FOR A VEHICLE EXHAUST SYSTEM

(71) Applicant: Faurecia Emissions Control Technologies, USA, LLC, Columbus, IN (US)

(72) Inventors: Robin Willats, Columbus, IN (US); Jerome Brian Hornback, Indianapolis, IN (US); Tony Parrish, Columbus, IN (US); John G. Rohde, Columbus, IN (US); Eric Ker, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 83 days.

(21) Appl. No.: 15/643,884

(22) Filed: Jul. 7, 2017

(65) Prior Publication Data
US 2019/0010850 A1 Jan. 10, 2019

(51) Int. Cl.
*F01N 3/28* (2006.01)
*F01N 3/20* (2006.01)
(Continued)

(52) U.S. Cl.
CPC .......... *F01N 3/2892* (2013.01); *F01N 3/035* (2013.01); *F01N 3/2066* (2013.01); *F01N 3/28* (2013.01);
(Continued)

(58) Field of Classification Search
CPC .. B01F 3/04049; B01F 5/0057; B01F 5/0471; B01F 5/0473; B01F 5/0614;
(Continued)

(56) References Cited

U.S. PATENT DOCUMENTS 7,059,118 B2   6/2006  Ripper et al.
7,849,676 B2   12/2010 Witte-Merl
(Continued)

FOREIGN PATENT DOCUMENTS

FR     2910533        6/2008
FR     2910533 A1 *   6/2008  .......... B01F 3/04049
(Continued)

OTHER PUBLICATIONS

Machine Translation of FR 2910533-A1.*
PCT/US2017/035130 Application, filed on May 31, 2017.

*Primary Examiner* — Brandon D Lee
(74) *Attorney, Agent, or Firm* — Carlson, Gaskey & Olds, P.C.

(57) ABSTRACT

A vehicle exhaust system includes an outer housing defining an internal cavity surrounding an axis, an inlet baffle configured to direct engine exhaust gas into the internal cavity, and an injector that is configured to spray a fluid into the internal cavity to mix with engine exhaust gas. An inner wall is spaced radially inward of an inner surface of the outer housing to define a gap. The inner wall has an impingement side facing the axis and a non-impingement side facing the gap. At least one heat transfer element is positioned within the gap and in is contact with at least one of the inner surface of the outer housing and the non-impingement side of the inner wall to transfer heat through the inner wall to the impingement side to reduce spray deposit formation.

21 Claims, 11 Drawing Sheets

(51) Int. Cl.
*F01N 13/10* (2010.01)
*F01N 3/035* (2006.01)
*B01F 5/04* (2006.01)
*B01F 5/02* (2006.01)
*B01F 3/04* (2006.01)
*B01F 5/06* (2006.01)

(52) U.S. Cl.
CPC .......... *F01N 13/10* (2013.01); *B01F 3/04049* (2013.01); *B01F 5/0268* (2013.01); *B01F 5/0473* (2013.01); *B01F 5/0614* (2013.01); *F01N 2240/20* (2013.01); *F01N 2610/1453* (2013.01); *Y02A 50/2325* (2018.01); *Y02T 10/24* (2013.01)

(58) Field of Classification Search
CPC ...... B01F 2005/0639; B01F 2215/0085; B01F 2215/0431; B01F 5/0478; B01F 5/0604; B01F 5/0615; F01N 3/2066; F01N 3/2892; F01N 1/083; F01N 1/087; F01N 1/088; F01N 2240/20; F01N 2610/02; F01N 2610/1453; Y02A 50/2325; Y02T 10/24
See application file for complete search history.

(56) References Cited

U.S. PATENT DOCUMENTS

| | | | |
|---|---|---|---|
| 7,877,983 | B2 | 2/2011 | Kunkel et al. |
| 8,114,364 | B2 | 2/2012 | Harinath et al. |
| 8,438,839 | B2 | 5/2013 | Floyd et al. |
| 8,756,921 | B2 | 6/2014 | Troxler et al. |
| 8,776,509 | B2 | 7/2014 | Wikaryasz et al. |
| 8,966,884 | B2 | 3/2015 | Kruse et al. |
| 9,057,312 | B2 | 6/2015 | Munnannur et al. |
| 9,062,582 | B2 | 6/2015 | Loman et al. |
| 9,103,258 | B2 | 8/2015 | Norling et al. |
| 9,140,163 | B2 | 9/2015 | Loman |
| 9,341,100 | B2 | 5/2016 | Petry |
| 9,494,067 | B2 | 11/2016 | Niaz |
| 9,581,067 | B2 | 2/2017 | Guilbaud et al. |
| 2007/0175204 | A1 | 8/2007 | Shirai et al. |
| 2010/0319329 | A1 | 12/2010 | Khadiya |
| 2011/0131958 | A1 | 6/2011 | Adelman et al. |
| 2015/0240689 | A1* | 8/2015 | Guilbaud .............. B01F 5/0268 60/295 |
| 2015/0273411 | A1 | 10/2015 | Chapman et al. |
| 2016/0084133 | A1 | 3/2016 | Sampath et al. |
| 2016/0115847 | A1 | 4/2016 | Chapman et al. |
| 2016/0332126 | A1 | 11/2016 | Nande et al. |
| 2017/0066012 | A1 | 3/2017 | Hornback |

FOREIGN PATENT DOCUMENTS

| | | |
|---|---|---|
| WO | 2009127449 | 10/2009 |
| WO | 2012000989 | 1/2012 |
| WO | 2014051617 | 4/2014 |
| WO | 2014098728 | 6/2014 |
| WO | 2015012829 | 1/2015 |
| WO | 2015105500 | 7/2015 |
| WO | 2015119617 | 8/2015 |
| WO | 2015187128 | 12/2015 |
| WO | 2015187162 | 12/2015 |
| WO | 2016036298 | 3/2016 |
| WO | 2016176076 | 11/2016 |
| WO | 2016176078 | 11/2016 |

* cited by examiner

MIXER FOR A VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a fluid such as a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. For example, there may be a lower ammonia uniformity index, there may be an increased pressure drop across the mixer, or there may be higher ammonia emissions during active diesel particulate filter (DPF) regeneration.

SUMMARY OF THE INVENTION

In one exemplary embodiment, a vehicle exhaust system includes an outer housing defining an internal cavity surrounding an axis, an inlet baffle configured to direct engine exhaust gas into the internal cavity, and an injector that is configured to spray a fluid into the internal cavity to mix with engine exhaust gas. An inner wall is spaced radially inward of an inner surface of the outer housing to define a gap. The inner wall has an impingement side facing the axis and a non-impingement side facing the gap. At least one heat transfer element is positioned within the gap and in is contact with at least one of the inner surface of the outer housing and the non-impingement side of the inner wall to transfer heat through the inner wall to the impingement side to reduce spray deposit formation.

In a further embodiment of the above, the at least one heat transfer element extends only partially about the axis.

In a further embodiment of any of the above, the inner wall extends only partially about the axis.

In a further embodiment of any of the above, the inlet baffle includes at least one inlet opening that at least partially overlaps the at least one heat transfer element such that engine exhaust gas is conducted through the at least one inlet opening to directly contact the at least one heat transfer element.

In a further embodiment of any of the above, the at least one heat transfer element comprises a sheet metal heat exchanger including a plurality of folds spaced apart from each other and extending about an outer periphery of the inner wall.

In a further embodiment of any of the above, the sheet metal heat exchanger is comprised of sheet metal including one or more of a roughened surface, divots, micro ribs, or turbulators.

In a further embodiment of any of the above, the sheet metal heat exchanger is comprised of a sheet of microporous material.

In a further embodiment of any of the above, the at least one heat transfer element comprises metal foam or mesh that is attached to the non-impingement side of the inner wall.

In a further embodiment of any of the above, the at least one heat transfer element comprises a coating applied to at least one of the inner surface of the outer wall or the non-impingement side of the inner wall to increase heat transfer to the impingement side of the inner wall.

In another exemplary embodiment, a mixer for a vehicle exhaust system includes an outer housing defining an internal cavity surrounding a center axis, an inlet baffle configured to direct engine exhaust gas into the internal cavity, wherein the inlet baffle includes at least one inlet opening formed along a periphery of the inlet baffle, and an injector mounted to the outer housing, with the injector being configured to spray a fluid into the internal cavity to mix with engine exhaust gas. An inner wall is spaced radially inward of an inner surface of the outer housing to define a gap and has an impingement side facing the axis and a non-impingement side facing the gap. At least one heat transfer element is positioned within the gap and is in alignment with the inlet opening such that engine exhaust gas is conducted through the inlet opening to directly contact the heat transfer element. The heat transfer element is in contact with at least one of the inner surface of the outer housing and the non-impingement side of the inner wall such that the at least one heat transfer element transfers heat through the inner wall to the impingement side to reduce spray deposit formation.

In a further embodiment of any of the above, the at least one heat transfer element extends only partially about the axis, and wherein the inner wall extends only partially about the axis, and wherein the at least one heat transfer element is defined by a first circumferential length extending about the center axis and the inner wall is defined by a second circumferential length extending about the center axis that is greater than the first circumferential length.

These and other features of this application will be best understood from the following specification and drawings, the following of which is a brief description.

DETAILED DESCRIPTION

Figure 1:
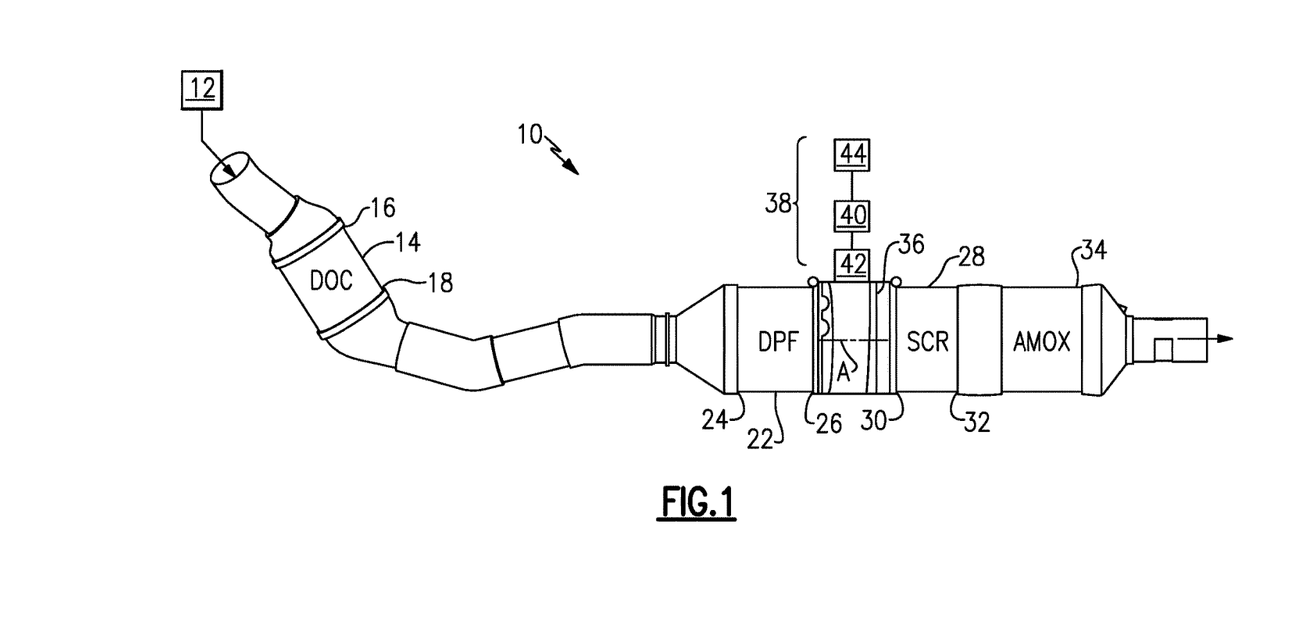
FIG. 1 illustrates one example of an exhaust system with a mixer according to the subject invention.

FIG. 1 shows a vehicle exhaust system 10 that conducts hot exhaust gases generated by an engine 12 through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known.

In one example configuration shown in FIG. 1, the exhaust components direct engine exhaust gases into a diesel oxidation catalyst (DOC) 14 having an inlet 16 and an outlet 18. Downstream of the DOC 14 there may be a diesel particulate filter (DPF) 22 that is used to remove contaminants from the exhaust gas as known. The DPF has an inlet 24 and an outlet 26. Downstream of the DOC 14 and optional DPF 22 is a selective catalytic reduction (SCR) catalyst 28 having an inlet 30 and an outlet 32. The outlet 32 communicates exhaust gases to downstream exhaust components 34. Optionally, component 28 can comprise a catalyst that is configured to perform a selective catalytic reduction function and a particulate filter function. The various downstream exhaust components 34 can include one or more of the following: pipes, additional filters, valves, additional catalysts, mufflers etc. These exhaust components can be mounted in various different configurations and combinations dependent upon vehicle application and available packaging space.

A mixer 36 is positioned upstream of the inlet 30 of the SCR catalyst 28 and downstream from the outlet 18 of the DOC 14, or the outlet 26 of the DPF 22. The upstream catalyst and downstream catalyst can be arranged to be in-line, parallel, or angled relative to each other. The mixer 36 is used to generate a swirling or rotary motion of the exhaust gas. This will be discussed in greater detail below.

An injection system 38 is used to inject a fluid such as DEF or a reducing agent, such as a solution of urea and water for example, into the exhaust gas stream upstream from the SCR catalyst 28 such that the mixer 36 can mix the fluid and exhaust gas thoroughly together. The injection system 38 includes a fluid supply 40, a doser or injector 42, and a controller 44 that controls injection of the fluid as known.

Figure 2A:
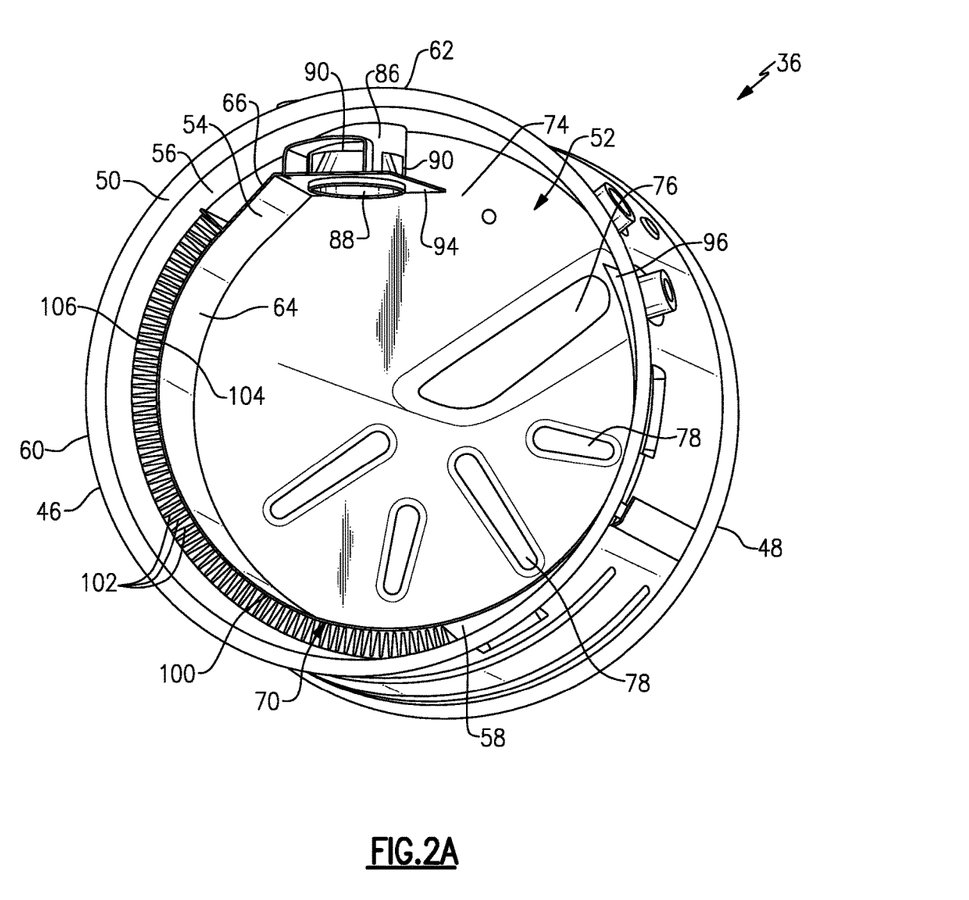
FIG. 2A is a perspective view of one example of a mixer with a heat transfer element configured to transfer heat through an inner wall to an impingement side to reduce spray deposit formation.
Figure 2B:
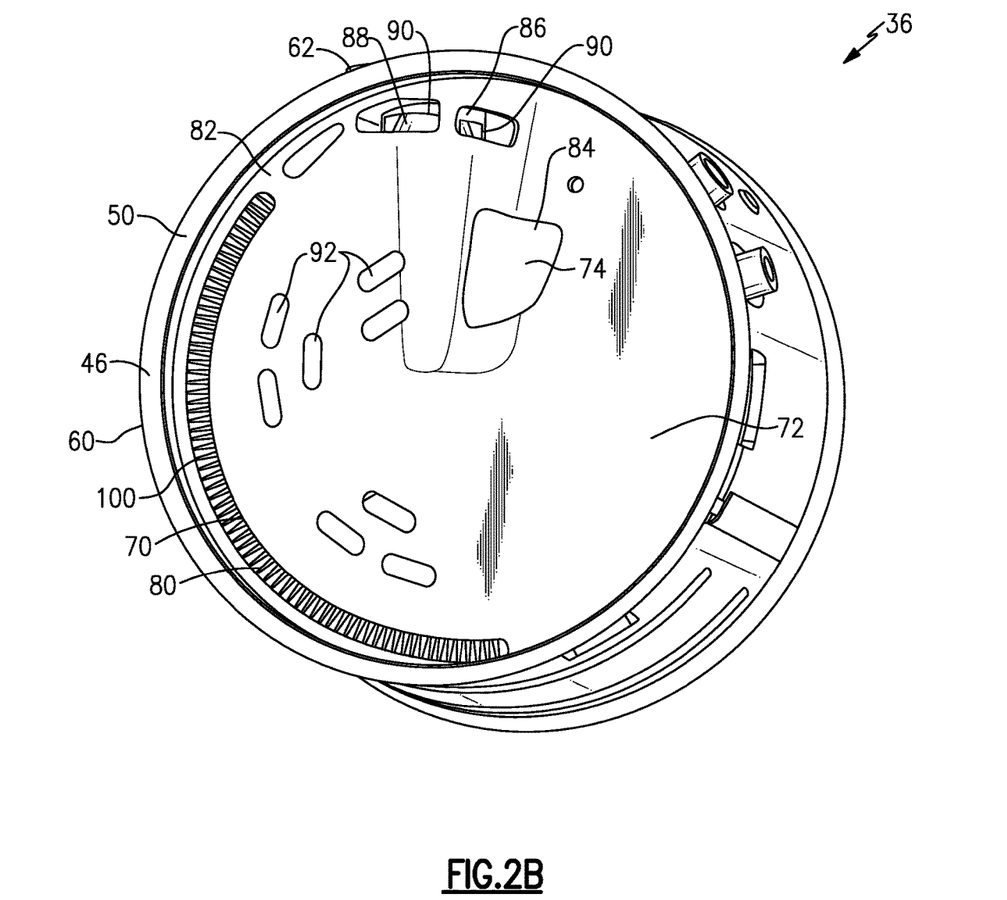
FIG. 2B is a view similar to FIG. 2A but showing an inlet baffle installed in the mixer.

One example of a mixer 36 is shown in FIGS. 2A-2B. The mixer 36 defines a mixer center axis A (FIG. 1) and has an inlet end 46 configured to receive the engine exhaust gases from the outlet 26 of the DPF 22 or the outlet 18 of the DOC 14 as shown in FIG. 1. The mixer 36 has an outlet end 48 to direct a mixture of swirling engine exhaust gas and products transformed from the injected fluid to the inlet 30 to the SCR catalyst 28. The mixer 36 includes an outer housing 50 defining an internal cavity 52 surrounding the axis A. An inner wall 54 is spaced radially inward of an inner surface 56 of the outer housing 50 to define a gap 58. The outer housing 50 also includes an outer surface 60 that forms an exterior/outermost surface of the mixer 36. The injector 42, which is configured to spray the fluid into the internal cavity 52 to mix with the engine exhaust gas, is mounted to the outer housing 50 at a mount area 62.

The inner wall 54 has an impingement side 64 facing the axis A and a non-impingement side 66 facing the gap 58. When the injector 42 sprays the fluid into the internal cavity 52 to mix with swirling exhaust gas, the mixture is directed in part toward the impingement side 64 of the inner wall 54 which comprises an impact zone. As the temperature of the spray is less than the temperature of the exhaust gas, the spray can have a cooling effect on the inner wall 54 at the impact zone such that deposits from the spray may start to form on the impingement side 64 of the inner wall 54.

In order to reduce the possibility of deposit formation, the mixer 36 includes at least one heat transfer element 70 that is positioned within the gap 58, and which is in contact with at least one of the inner surface 56 of the outer housing 50 and the non-impingement side 64 of the inner wall 54. The heat transfer element 70 is configured to transfer heat through the inner wall 54 to the impingement side 64 such that possibility of spray deposit formation is significantly reduced.

An inlet baffle 72 (FIG. 2B) is mounted to the inlet end 46 of the mixer 36 and is configured to direct engine exhaust gas into the internal cavity 52. The mixer 36 also includes an outlet baffle 74 (FIG. 2A) through which a mixture of spray and exhaust gas exits the outlet end 48 of the mixer 36. In the example shown in FIG. 2A, the outlet baffle 74 comprises a plate that includes a primary opening 76 through which a majority of a mixture of engine exhaust gas and spray exits the internal cavity 52 and a plurality of secondary openings 78 that are smaller than the primary opening 76. The secondary openings 78 help reduce back pressure and can be configured to have different shapes, sizes, and/or patterns in various combinations.

The inlet baffle 72 comprises a plate that includes at least one first inlet opening 80 that extends along a peripheral edge 82 of the inlet baffle 72. The first inlet opening 80 at least partially overlaps the heat transfer element 70 such that engine exhaust gas is conducted through the inlet opening 80 to directly contact and heat the heat transfer element 70. In one example, the heat transfer element 70 extends in a peripheral direction about the axis A, and the inlet opening 80 extends along the peripheral edge 82 of the inlet baffle 72 and overlaps an entire peripheral length of the heat transfer element 70. This significantly improves heat transfer and maximizes the heating capability of the heat transfer element 70.

The inlet baffle 72 also includes one or more second inlet openings 84 positioned adjacent to the injector 42 and injector mount area 62 to direct the engine exhaust gas toward spray entering the internal cavity 52. In one example, the mixer includes an inlet housing 86 that at least partially surrounds an inlet cone 88 that extends inwardly from the inner surface of the outer housing 50 as shown in FIG. 2A. The injector 42 (FIG. 1) is mounted to the mount area 62 such that fluid spray enters an inlet end of the inlet cone 88 and then diverges outwardly to exit an outlet end of the cone 88. The inlet housing 86 includes openings 90 that help direct exhaust gas toward the inlet end of the cone 88 to mix with the fluid spray.

The inlet baffle 72 also includes one or more third inlet openings 92 that are smaller than the first 80 and second 84 inlet openings. The third inlet openings 92 are positioned on the inlet baffle 72 to reduce back pressure. The third inlet openings 92 are typically smaller than the second inlet opening 84. The third inlet openings 92 can be configured to have different shapes, sizes, and/or patterns in various combinations.

Note that the plates shown in the disclosed examples for the inlet 72 and outlet 74 baffles are just one example. It should be understood that the plates could be flat or have a contoured or helical plate configuration. Further, the number and configuration of the various inlet and outlet openings can be varied dependent upon different applications.

In one example, the heat transfer element 70 extends only partially about the axis A. This is best shown in FIG. 2A where the heat transfer element 70 is positioned within the gap 58 only on one side of the mixer 36. In one example, the heat transfer element 70 is positioned in the gap 58 opposite from the impact zone. As discussed above, the outer housing 50 extends circumferentially and completely around the axis A which is at a center of the outer housing 50. The inner wall 54 extends only partially about the axis A. In other words, the inner wall 54 does not completely surround the axis A. In the example shown in FIG. 2A, the inner wall 54 has a first end 94 that is supported at least in part by the inlet housing 86 and extends circumferentially to a second end 96 that is circumferentially spaced apart from the first end 94 by a gap.

In one example, the heat transfer element 70 extends a first circumferential length and the inner wall 54 extends a second circumferential length that is greater than the first circumferential length. In one example, the first circumferential length extends approximately one hundred and eighty degrees or less around the axis A and the second circumferential length extends more than one hundred and eighty degrees around the axis A and less than three hundred and sixty degrees about the axis A. This is just one example configuration, the first and second circumferential lengths can be extended and/or shortened as needed dependent upon different applications.

The heat transfer element 70 can comprise various different types of structures. In the example shown in FIGS. 2A-2B, the heat transfer element 70 comprises a sheet metal heat exchanger 100 including a plurality of folds 102 spaced apart from each other and extending about an outer periphery of the inner wall 54. The sheet metal heat exchanger 100 can be in contact with one or both of the inner wall 54 and outer housing 50. In one example, an apex 104 of one fold 102 is adjacent to or in contact with the non-impingement side 64 of the inner wall 54 and an apex 106 of an immediately adjacent fold 102 is in contact with the inner surface 56 of the outer housing 50. Optionally, the apex 106 is spaced from the inner surface 56 by a gap.

Figure 3:
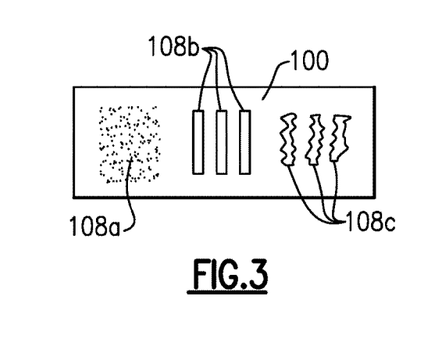
FIG. 3 is a schematic illustration of additional heat features added to the heat transfer element of FIGS. 2A-2B.

In one example shown in FIG. 3, the sheet metal heat exchanger 100 is comprised of sheet metal that includes additional heat transfer features to further enhance heating of the inner wall 54. These additional heat transfer features extend outwardly from the surface of the sheet metal and can comprise one or more of a roughened surface 108a, micro ribs 108b, or turbulators 108c. In one example, the rough surface 108a can be provided by a coating comprising a heat exchange coating of a material with higher roughness surface than the sheet metal, a higher heat transfer coefficient, and/or an active catalyst coating. These are just some examples of additional heat transfer features, other features could be steps, divots, louvers tabs, concave or convex shapes to generate turbulence, etc. In one example the additional heat transfer features have a dimension that is between 0.5 and 3 times the material thickness of the sheet metal. The sheet metal is shown in FIG. 3 as being flat for purposes of clarity with regard to the additional heat transfer features. The sheet metal of FIG. 3 would be folded in a manner such as that show in FIGS. 2A-2B.

In one example, the sheet metal comprises stainless steel or copper; however, other materials could also be used. In one example, the thickness of the sheet metal is less than or equal to a thickness of the inner wall 54. The sheet metal is attached to the non-impingement side of the inner wall 54 at one or more discreet locations; or can be attached along the whole surface area of the attachment interface. The sheet metal can be attached by laser welding, rolled seam resistance welding, nickel brazing, or nickel brazing with induction for example. Special concave cavities can be formed on the attachment areas to hold the brazing material as needed.

Figure 4A:
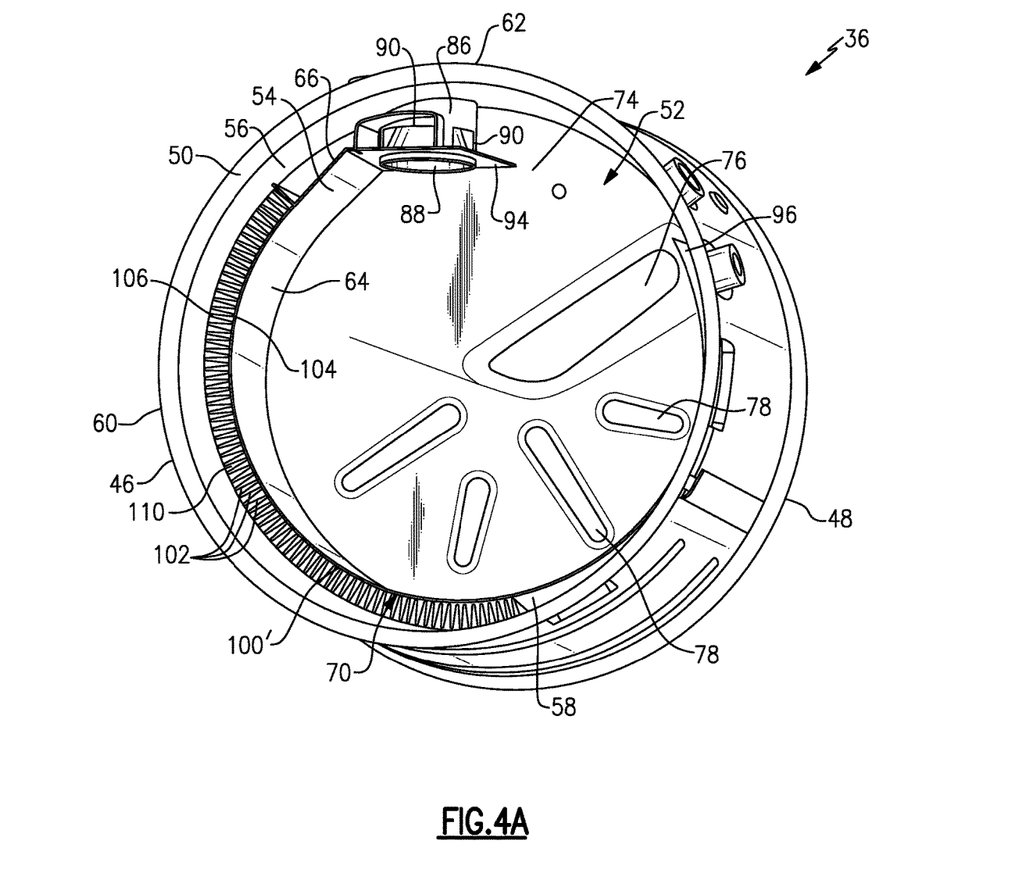
FIG. 4A is a perspective view of another example of a mixer with a heat transfer element configured to transfer heat through an inner wall to an impingement side to reduce spray deposit formation.
Figure 4B:
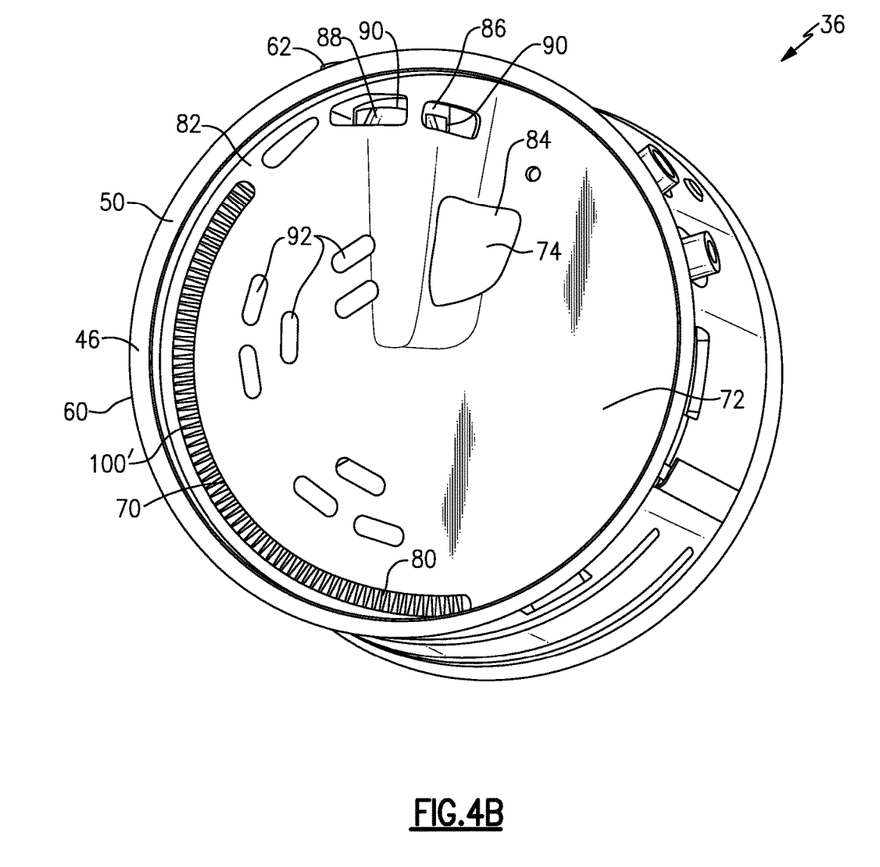
FIG. 4B is a view similar to FIG. 4A but showing an inlet baffle installed in the mixer.

FIGS. 4A-4B show another example of a sheet metal heat exchanger 100'. In this example, the sheet metal heat exchanger 100' comprises a thin sheet metal 110 that is comprised of microporous material. The sheet metal 110 can include a surface layer of microporous material or the entire sheet may be formed from microporous material. The sheet metal 110 is folded in a manner similar to that of FIGS. 2A-2B. FIG. 4A shows the mixer 36 with the inlet baffle 72 removed so that the sheet metal heat exchanger 100' can be seen as positioned within the gap 58.

The inner wall 54 is configured similar to that of FIGS. 2A-2B and does not extend completely about the axis A. Further, the sheet metal heat exchanger 100' also does not extends completely around the axis A. The sheet metal heat exchanger 100' extends along the portion of the inner wall 54 that comprises the impact zone for fluid spray. Exhaust gas enters the first inlet opening 80 in the inlet baffle 72 to flow directly into the gap 58 such that heat from the exhaust gas flowing past the sheet metal heat exchanger 100' can be transferred to the inner wall 54 to reduce deposit formation on the impingement side 64.

In one example, the sheet metal 110 comprises stainless steel; however, other materials could also be used. In one example, the thickness of the sheet metal is less than or equal to a thickness of the inner wall 54. The sheet metal 110 is attached to the non-impingement side 66 of the inner wall 54 at one or more discreet locations; or can be attached along the whole surface area of the attachment interface. The sheet metal 110 can be attached by laser welding, rolled seam resistance welding, nickel brazing, or nickel brazing with induction for example. Special concave cavities can be formed on the attachment areas to hold the brazing material as needed.

Figure 5:
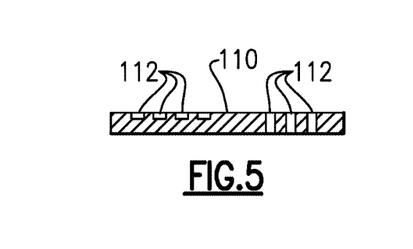
FIG. 5 is a schematic illustration of holes/slits as used in the heat transfer element of FIGS. 4A-4B.

In one example, the sheet metal 110 includes holes/slits 112 as shown in FIG. 5. In one example, the holes/slits 112 have a size that is one-tenth material thickness up to 5 material thickness.

Figure 6A:
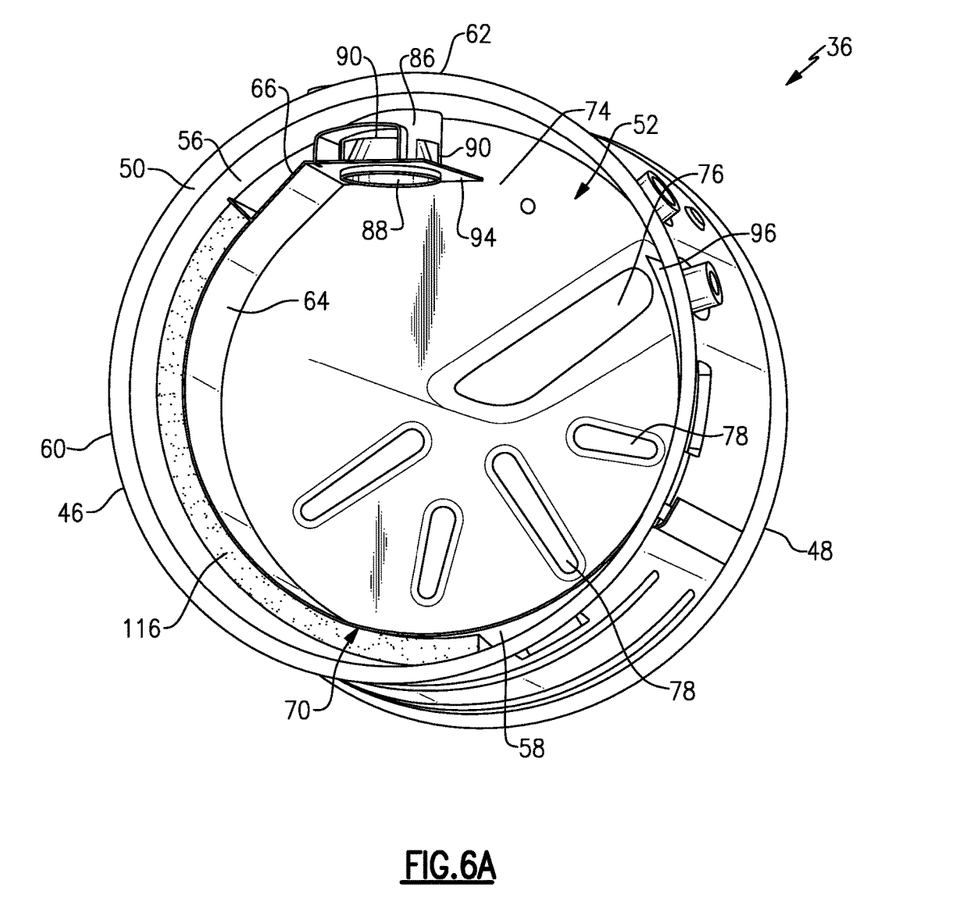
FIG. 6A is a perspective view of another example of a mixer with a heat transfer element configured to transfer heat through an inner wall to an impingement side to reduce spray deposit formation.
Figure 6B:
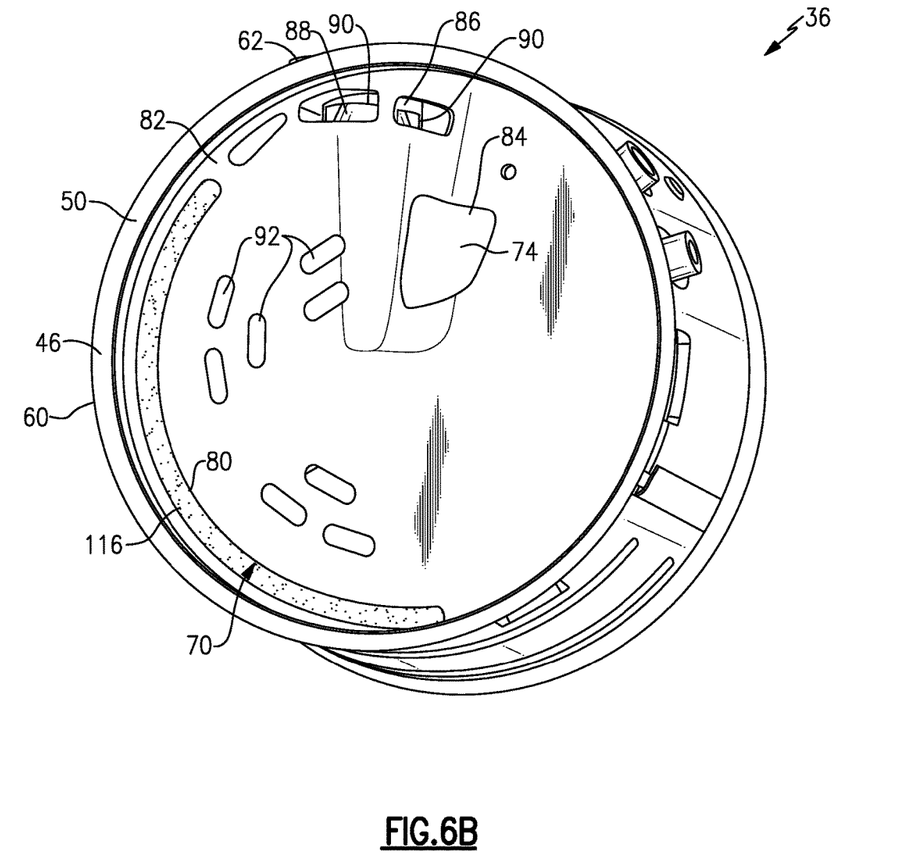
FIG. 6B is a view similar to FIG. 6A but showing an inlet baffle installed in the mixer.
Figure 7:
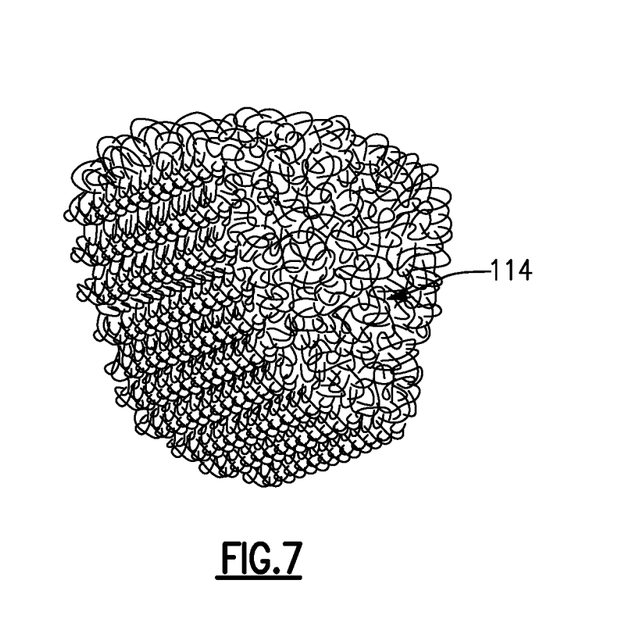
FIG. 7 is a schematic illustration of a material as used in the heat transfer element of FIGS. 6A-6B.
Figure 8:
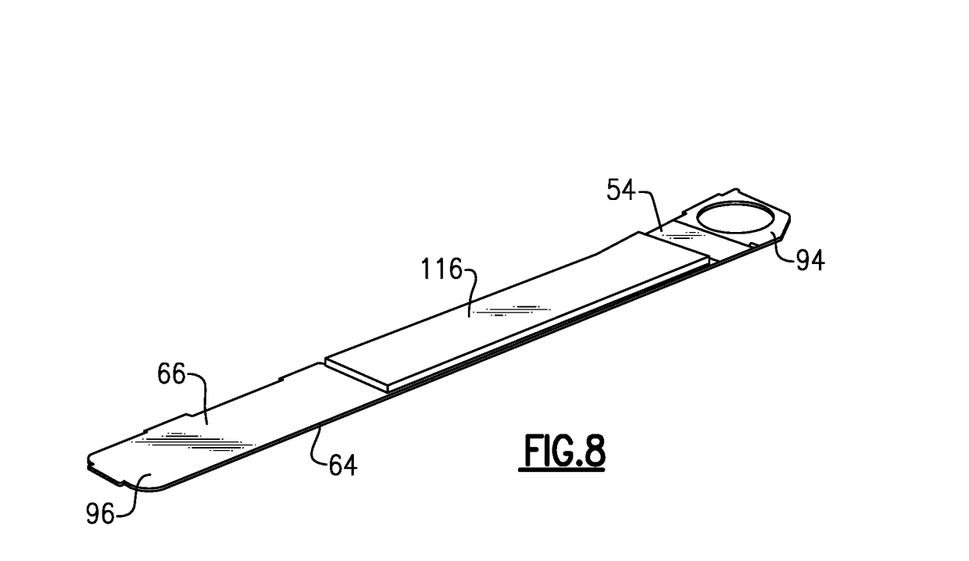
FIG. 8 shows a layer of a material as used in the configurations of FIGS. 6A-6B applied to the inner wall.

FIGS. 6A-6B show another example of a heat transfer element 70. In this example, the heat transfer element 70 comprises metal foam/steel foam, wire mesh, or copper that is attached to the non-impingement side 66 of the inner wall 54. FIG. 7 shows an example of a wire mesh material 114. As shown in FIG. 8, a layer 116 of the metal foam or mesh material is applied to the non-impingement side 66 of the inner wall 54. The inner wall 54 is then installed into the mixer 36 as shown in FIG. 6A. FIG. 6A shows the mixer 36 with the inlet baffle 72 removed for purposes of clarity.

The inner wall 54 is configured similar to that of FIGS. 2A-2B and does not extend completely about the axis A. Further, the layer 116 of metal foam or mesh also does not extends completely around the axis A. The layer 116 extends along the portion of the inner wall 54 that comprises the impact zone for fluid spray. Exhaust gas enters the first inlet opening in the inlet baffle 72 to flow directly into the gap 58 such that heat from the exhaust gas flowing past the layer 116 can be transferred to the inner wall 54 to reduce deposit formation on the impingement side 64.

In one example, the layer 116 is attached by laser welding, nickel brazing, or nickel brazing with induction for example. Special concave cavities can be formed on the attachment areas to hold the brazing material as needed. The layer 116 of metal foam or mesh provides a tortuous path/air flow configuration with a significant amount of surface area for heat transfer to the inner wall 54.

Figure 9A:
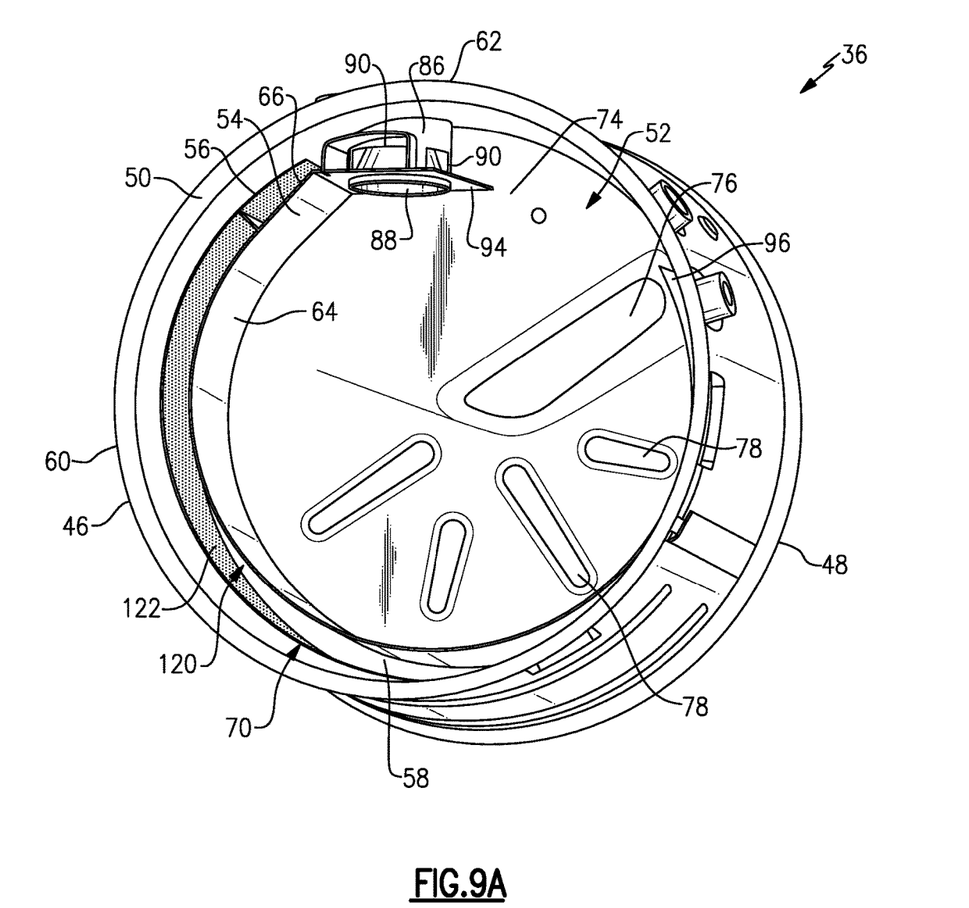
FIG. 9A is a perspective view of another example of a mixer with a heat transfer element configured to transfer heat through an inner wall to an impingement side to reduce spray deposit formation.
Figure 9B:
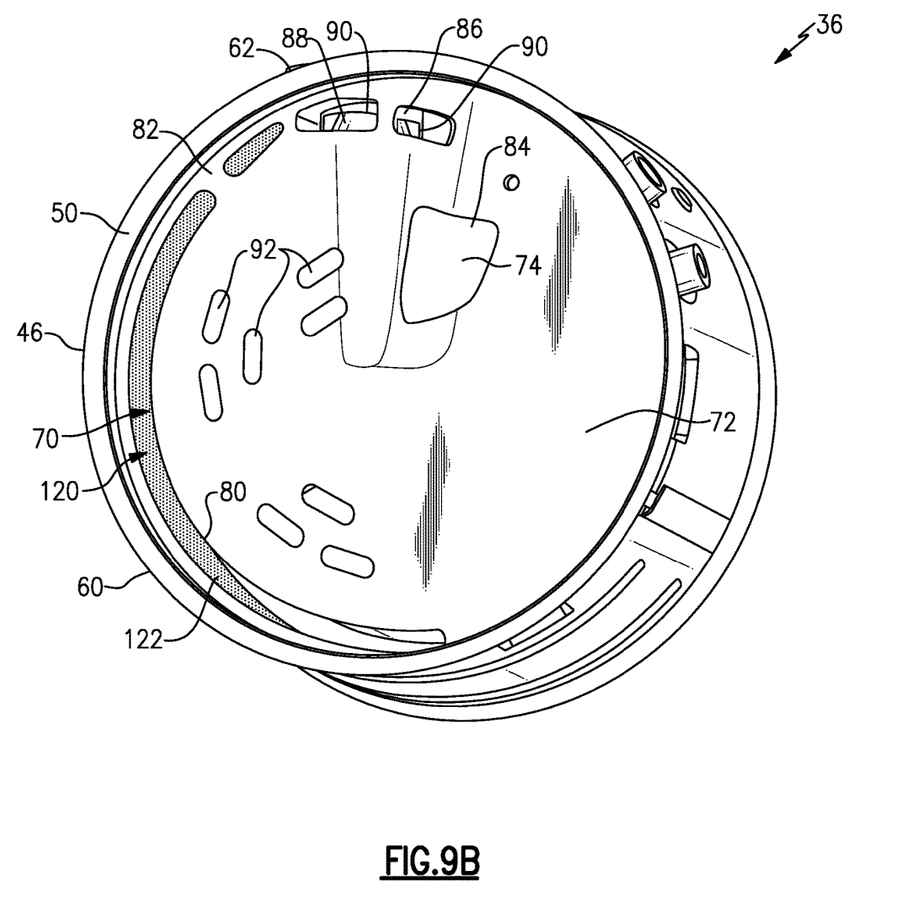
FIG. 9B is a view similar to FIG. 9A but showing an inlet baffle installed in the mixer.
Figure 9C:
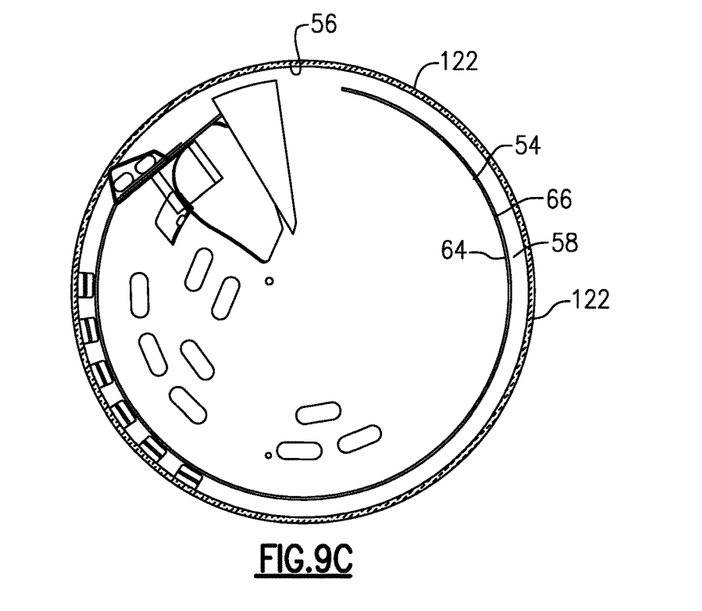
FIG. 9C shows a coating applied to an inner surface of an outer housing of the mixer as shown in FIGS. 9A-9B.
Figure 10:
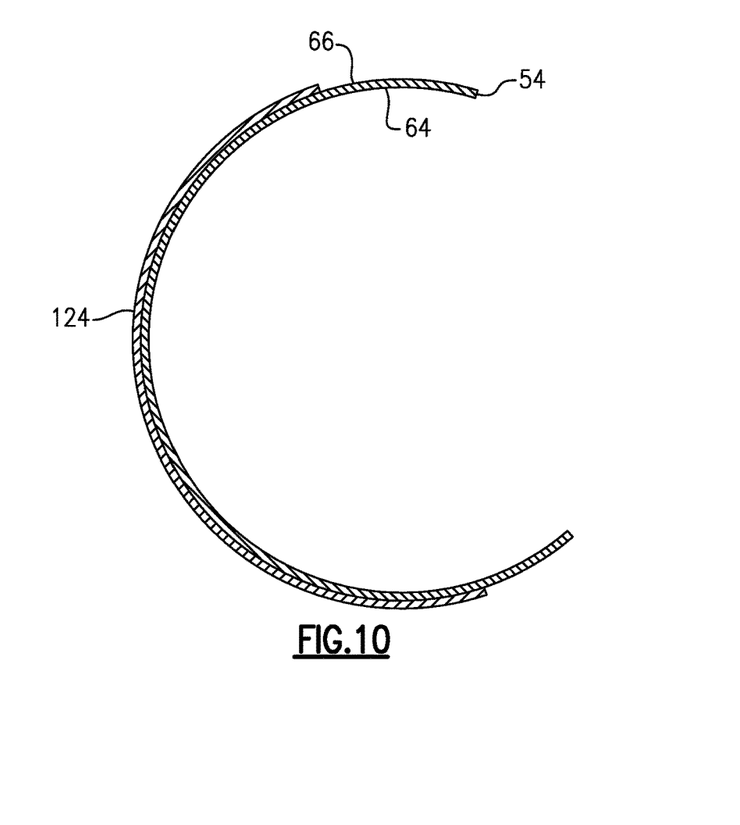
FIG. 10 shows another example where a coating is applied to a non-impingement side of the inner wall.

FIGS. 9A-9C show another example of a heat transfer element 70. In this example, the heat transfer element 70 comprises a coating 120 applied to at least one of the inner surface 56 of the outer housing 50 or the non-impingement side 66 of the inner wall 54 to increase heat transfer to the impingement side 64 of the inner wall 54. FIGS. 9A-9C show an example of applying a layer of insulating material 122 to the inner surface 56 of the outer housing 50 to trap the heat inside the mixer 36. FIG. 10 shows an example of applying a coating layer 124 of a material such as copper or a catalyst material that would react with the exhaust gas to increase heat transfer to the non-impingement side 66 of the inner wall 54. However, the insulating configuration of FIGS. 9A-9C is preferred from a cost and simplicity standpoint.

In one example, the layer of insulating material 122 that is applied to the inner surface 56 of the outer housing 50 comprises a ceramic material. In one example, a ceramic coating is applied in a matrix or grid work pattern on the inner surface 56 of the outer housing 50. This avoids thermal expansion fracture. In one example, the insulating coating is sprayed onto the inner surface 56; however, other methods of application could also be used.

In each of the disclosed embodiments, the heat transfer element 70 is used to extract heat from the exhaust gas and transfer it to the inner wall 54. Each embodiment provides a large surface area for heat transfer such that there is good heat conduction to the inner wall 54. Further, there is a high ratio between the open area and the closed area (thin walls/open foam or mesh). As a result, the inner wall 54 is able to heat the impingement side 66 in the impact zone such deposit formation is significantly reduced, which makes the mixer 36 operate more efficiently.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
   an outer housing defining an internal cavity surrounding an axis;
   an inlet baffle configured to direct engine exhaust gas into the internal cavity;
   an injector that is configured to spray a fluid into the internal cavity to mix with engine exhaust gas;
   an inner wall spaced radially inward of an inner surface of the outer housing to define a gap, wherein the inner wall has an impingement side facing the axis and a non-impingement side facing the gap; and
   at least one heat transfer element positioned within the gap and in contact with at least one of the inner surface of the outer housing and the non-impingement side of the inner wall such that engine exhaust gas is conducted through the gap to directly contact and heat the heat transfer element, the at least one heat transfer element to transfer heat through the inner wall to the impingement side to reduce spray deposit formation.

2. The vehicle exhaust system according to claim 1 wherein the at least one heat transfer element extends only partially about the axis.

3. The vehicle exhaust system according to claim 2 wherein the outer housing extends circumferentially around the axis located at a center of the outer housing, and wherein the inner wall extends only partially about the axis, and wherein the at least one heat transfer element extends a first circumferential length and the inner wall extends a second circumferential length, and wherein the first circumferential length extends one hundred and eighty degrees or less around the axis and the second circumferential length extends more than one hundred and eighty degrees around the axis and less than three hundred and sixty degrees about the axis.

4. The vehicle exhaust system according to claim 1 wherein the inlet baffle includes at least one inlet opening that at least partially overlaps the at least one heat transfer element such that engine exhaust gas is conducted through the at least one inlet opening to directly contact the at least one heat transfer element.

5. The vehicle exhaust system according to claim 4 wherein the at least one heat transfer element extends in a peripheral direction about the axis, and wherein the at least one inlet opening extends along a peripheral edge of the inlet baffle and overlaps an entire peripheral length of the at least one heat transfer element.

6. The vehicle exhaust system according to claim 5 wherein the inlet baffle includes at least one second inlet opening positioned adjacent to the injector to direct engine exhaust gas toward spray entering the internal cavity.

7. The vehicle exhaust system according to claim 6 wherein the inlet baffle includes a plurality of third inlet openings that are smaller than the first and second inlet openings, and which are positioned on the inlet baffle to reduce back pressure.

8. The vehicle exhaust system according to claim 1 wherein the at least one heat transfer element comprises a sheet metal heat exchanger including a plurality of folds spaced apart from each other and extending about an outer periphery of the inner wall.

9. The vehicle exhaust system according to claim 8 wherein an apex of one fold is in contact with the non-impingement side and an apex of an immediately adjacent fold is in adjacent to the inner surface of the outer housing.

10. The vehicle exhaust system according to claim 8 wherein the sheet metal heat exchanger is comprised of sheet metal including one or more of a roughened surface, micro ribs, divots, or turbulators.

11. The vehicle exhaust system according to claim 8 wherein the sheet metal heat exchanger is comprised of a sheet or layer of microporous material.

12. The vehicle exhaust system according to claim 1 wherein the at least one heat transfer element comprises metal foam or mesh that is attached to the non-impingement side of the inner wall.

13. The vehicle exhaust system according to claim 1 wherein the at least one heat transfer element comprises a coating applied to at least one of the inner surface of the outer housing or the non-impingement side of the inner wall to increase heat transfer to the impingement side of the inner wall.

14. The vehicle exhaust system according to claim 13 wherein the coating comprises a ceramic coating that is applied in a matrix or grid work pattern on the inner surface of the outer housing.

15. A mixer for a vehicle exhaust system comprising:
an outer housing defining an internal cavity surrounding a center axis;
an inlet baffle configured to direct engine exhaust gas into the internal cavity, wherein the inlet baffle includes at least one inlet opening formed along a periphery of the inlet baffle;
an injector mounted to the outer housing, the injector being configured to spray a fluid into the internal cavity to mix with engine exhaust gas;
an inner wall spaced radially inward of an inner surface of the outer housing to define a gap, wherein the inner wall has an impingement side facing the axis and a non-impingement side facing the gap; and
at least one heat transfer element positioned within the gap and in alignment with the at least one inlet opening such that engine exhaust gas is conducted through the at least one inlet opening to directly contact the at least one heat transfer element, the at least one heat transfer element being in contact with at least one of the inner surface of the outer housing and the non-impingement side of the inner wall such that the at least one heat transfer element transfers heat through the inner wall to the impingement side to reduce spray deposit formation.

16. The mixer for a vehicle exhaust system according to claim 15 wherein the at least one heat transfer element extends only partially about the axis, and wherein the inner wall extends only partially about the axis, and wherein the at least one heat transfer element is defined by a first circumferential length extending about the center axis and the inner wall is defined by a second circumferential length extending about the center axis that is greater than the first circumferential length.

17. The mixer for a vehicle exhaust system according to claim 16 wherein the at least one heat transfer element comprises a sheet metal heat exchanger including a plurality of folds spaced apart from each other and extending about an outer periphery of the inner wall, and wherein an apex of one fold is in contact with the non-impingement side and an apex of an immediately adjacent fold is adjacent to the inner surface of the outer housing.

18. The mixer for a vehicle exhaust system according to claim 16 wherein the sheet metal heat exchanger is comprised of sheet metal or a sheet of microporous material and includes one or more of a roughened surface, divots, micro ribs, or turbulators.

19. The mixer for a vehicle exhaust system according to claim 16 wherein the at least one heat transfer element comprises metal foam or mesh that is attached to the non-impingement side of the inner wall.

20. The mixer for a vehicle exhaust system according to claim 15 wherein the at least one heat transfer element comprises a coating applied to at least one of the inner surface of the outer wall or the non-impingement side of the inner wall to increase heat transfer to the impingement side of the inner wall.

21. The mixer for a vehicle exhaust system according to claim 15 wherein the at least one heat transfer element extends in a peripheral direction about the axis, and wherein the at least one inlet opening extends along a peripheral edge of the inlet baffle and overlaps an entire peripheral length of the at least one heat transfer element such that engine exhaust gas is conducted through the gap to directly contact and heat the at least one heat transfer element.

* * * * *

UNITED STATES PATENT AND TRADEMARK OFFICE
CERTIFICATE OF CORRECTION

PATENT NO. : 10,337,380 B2
APPLICATION NO. : 15/643884
DATED : July 2, 2019
INVENTOR(S) : Willats et al.

It is certified that error appears in the above-identified patent and that said Letters Patent is hereby corrected as shown below:

In the Claims

Claim 6, Column 8, Line 52; insert after "claim 5" and before "wherein the inlet baffle…" --wherein the at least one inlet opening comprises at least one first inlet opening and--

Claim 15, Column 9, Line 36; replace "the axis" with --the center axis--

Claim 16, Column 10, Line 6; replace "the axis" with --the center axis--

Claim 16, Column 10, Line 7; replace "the axis" with --the center axis--

Claim 18, Column 10, Line 22; replace "claim 16" with --claim 17--

Claim 20, Column 10, Line 33; replace "the outer wall" with --the outer housing--

Claim 21, Column 10, Line 38; replace "the axis" with --the center axis--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*